(12) United States Patent
Clavel et al.

(10) Patent No.: US 6,305,837 B1
(45) Date of Patent: Oct. 23, 2001

(54) INSTALLATION FOR IMMERSING THE GRAPE IN ITS JUICE IN A VINIFICATION TANK

(75) Inventors: Denis Clavel; André Saby, both of Saint Gervais (FR)

(73) Assignee: Saby Clavel Technologie, Bagnols sur Ceze (FR)

( * ) Notice: Subject to any disclaimer, the term of this patent is extended or adjusted under 35 U.S.C. 154(b) by 0 days.

(21) Appl. No.: 09/591,501

(22) Filed: Jun. 12, 2000

(30) Foreign Application Priority Data

Jun. 14, 1999 (FR) .................................. 99 07698

(51) Int. Cl.[7] ...................................................... B01F 7/16
(52) U.S. Cl. ............................................ 366/308; 366/286
(58) Field of Search .................... 366/242, 244, 366/245, 247, 249, 250, 251, 252, 285, 286, 308, 343

(56) References Cited

U.S. PATENT DOCUMENTS

| | | | | |
|---|---|---|---|---|
| 579,055 | * | 3/1897 | Gates | 366/308 |
| 612,349 | * | 10/1898 | Kollenberg | 366/308 |
| 655,552 | * | 8/1900 | Gorton | 366/308 |
| 697,579 | * | 4/1902 | Wehmeier et al. | 366/252 |
| 955,978 | * | 4/1910 | Mitchell | 366/308 |
| 1,218,623 | * | 3/1917 | Brillhart | 366/308 |
| 1,841,435 | * | 1/1932 | Gibson | 366/308 |
| 1,962,646 | * | 6/1934 | Logue | 366/331 |
| 2,146,566 | * | 2/1939 | Daman | 366/286 |
| 2,609,185 | * | 9/1952 | Eisner | 366/285 |
| 3,132,850 | * | 5/1964 | Puchalski | 366/308 |
| 3,381,941 | * | 5/1968 | Gibson | 366/308 |
| 4,519,714 | * | 5/1985 | Johnson et al. | 366/285 |
| 4,832,501 | * | 5/1989 | McCauley | 366/286 |
| 4,836,687 | * | 6/1989 | Kardoes et al. | 366/286 |
| 4,872,764 | * | 10/1989 | McClean | 366/308 |
| 5,282,681 | * | 2/1994 | Supelak | 366/285 |
| 5,356,214 | * | 10/1994 | Styles | 366/285 |
| 5,366,289 | * | 11/1994 | Supelak | 366/308 |
| 5,836,688 | * | 11/1998 | Eping | 366/285 |
| 5,885,001 | * | 3/1999 | Thomas | 366/308 |

FOREIGN PATENT DOCUMENTS

| | | |
|---|---|---|
| 3623694 | 1/1988 | (DE) . |
| 2642085 | 7/1990 | (FR) . |
| 2767332 | 2/1999 | (FR) . |
| 2767333 | 2/1999 | (FR) . |

* cited by examiner

*Primary Examiner*—Tony G. Soohoo
(74) *Attorney, Agent, or Firm*—Stevens, Davis, Miller & Mosher, LLP

(57) ABSTRACT

An installation for immersing the grape in its juice in a vinification tank includes a support installed over an opening of the tank. A paddle is moved on the support by a rod between a top area which in use is above the juice and a bottom area which in use is in the juice. The paddle pivots by a predetermined angle about the axis of the rod when the paddle is in the top area. The top end of the rod is mounted on the support and fixed against movement in translation.

36 Claims, 2 Drawing Sheets

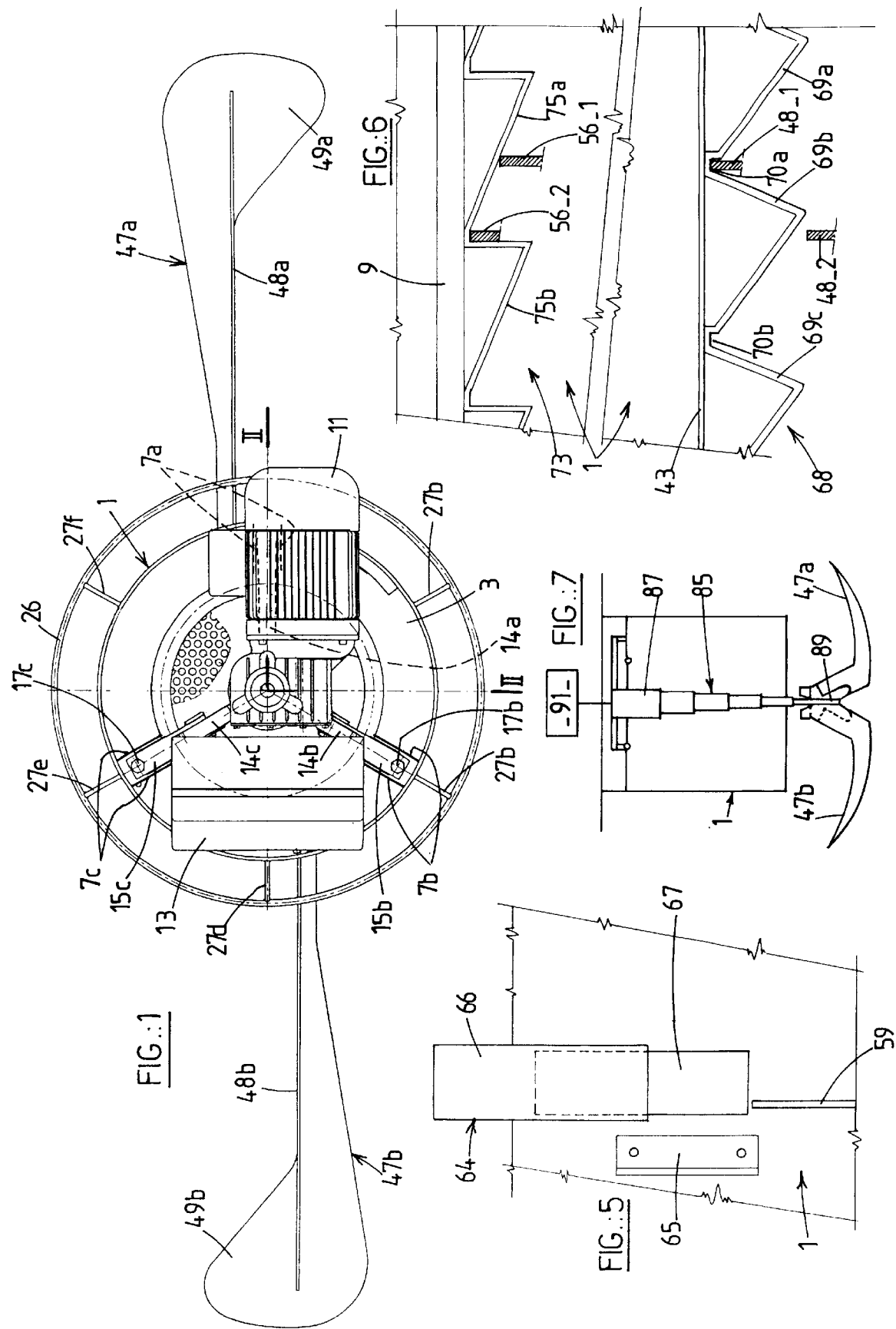

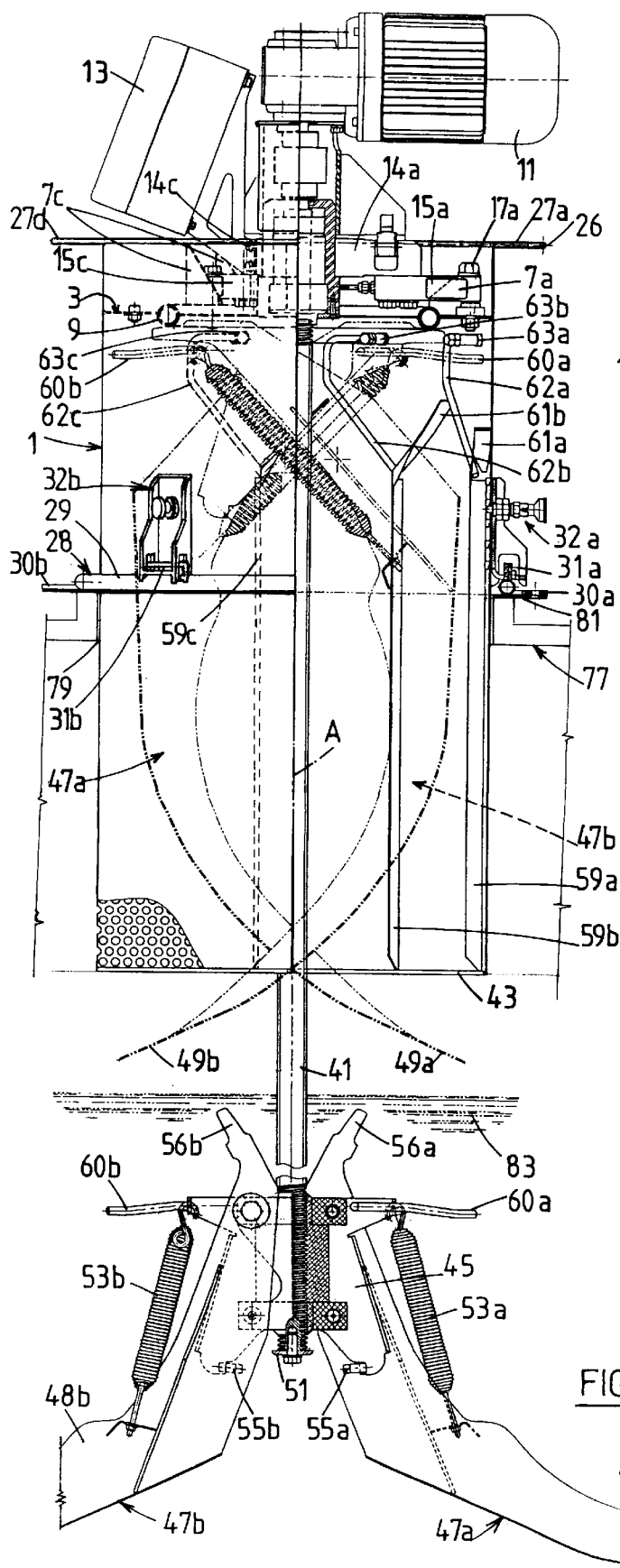
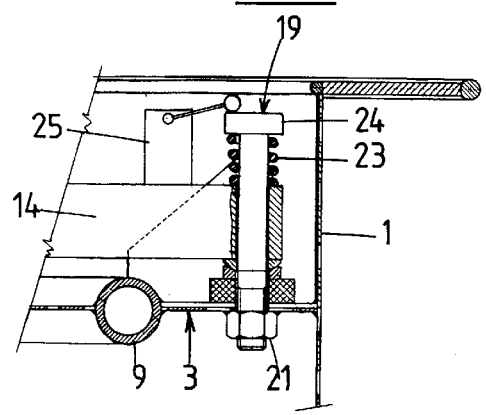
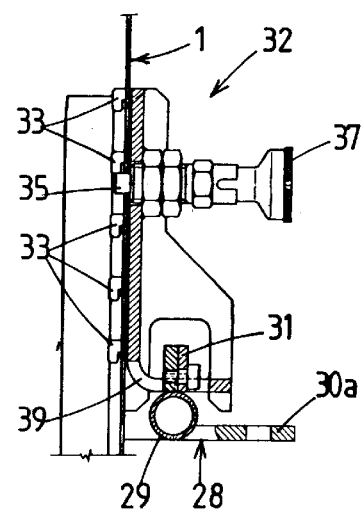

INSTALLATION FOR IMMERSING THE GRAPE IN ITS JUICE IN A VINIFICATION TANK

BACKGROUND OF THE INVENTION

1. Field of the Invention

The present invention relates to an installation for immersing the grape in its juice in a vinification tank.

2. Description of the Prior Art

French patent application FR 98 02507 discloses an installation for immersing the grape in its juice in a vinification tank and including support means intended to be installed over the opening of said tank, at least one paddle mounted to be moved on said support means by a rod between a top area above the juice and a bottom area in the juice and means for pivoting the paddle by a predetermined angle about the axis of the rod when the paddle is in the top area.

In the above prior art installation, which includes two paddles, the rod is threaded, the paddles are constrained to rotate with the rod and a nut mounted to be rotatable on the support means, driven by an electric motor and cooperating with the rod is used to raise or lower it selectively and thus move the paddles into the top or bottom area.

When the rod rises, it projects above the top part of the support means. It is therefore necessary to ensure that a relatively large height is available above the tank.

This constraint is in practice rarely satisfied because, given the need to optimize the use of the space available in a cellar, the tank height is frequently only slightly less than the height below the ceiling of the cellar.

Furthermore, and in particular for safety reasons, the area within which the rod can move has to be confined within a casing, which increases the cost of manufacture and the weight of the above prior art installation.

Furthermore, the means for pivoting the paddles by a predetermined angle include a ratchet system in the top part of said casing, which also increases the overall height of the above prior art installation.

It is further necessary to reinforce the protective casing so that it can support the ratchet system, which increases the cost of manufacture and the weight of the above installation.

For example, the weight of the above installation can easily reach approximately one hundred kilograms, which makes handling it particularly inconvenient and dangerous, in particular if it must be moved from one tank to another.

The object of the present invention is to provide an installation for immersing the grape which does not have the drawbacks mentioned above.

SUMMARY OF THE INVENTION

The above object of the invention is achieved with an installation for immersing the grape in its juice in a vinification tank, the installation including support means adapted to be installed over an opening of the tank, a paddle adapted to be moved on the support means by a rod between a top area which in use is above the juice and a bottom area which in use is in the juice, and means for pivoting the paddle by a predetermined angle about the axis of the rod when the paddle is in the top area, wherein the top end of the rod is mounted on the support means and fixed against movement in translation.

Because of the above features, the paddles can be moved vertically between the top and bottom areas without the rod projecting above the support means, which enables the overall height of the installation to be reduced.

It is furthermore not necessary to provide any protective casing, which reduces the cost of manufacture and the weight of the installation.

The object of the invention is also achieved with an installation for immersing the grape in its juice in a vinification tank, said installation including support means adapted to be installed over an opening of said tank and defining a certain volume, a paddle adapted to be moved on said support means by a rod between a top area which in use is above said juice and a bottom area which in use is in said juice and means for pivoting said paddle by a predetermined angle about the axis of said rod when said paddle is in said top area, wherein said pivoting means are placed at least in part inside said volume.

By virtue of the above features, at least some of the pivoting means can be moved inside the volume defined by the support means, which reduces the overall height, the cost of manufacture and the weight of the installation.

According to other features of the above installation:

the rod is threaded, the paddle is adapted to be pivoted about the axis of the rod by a nut, the rod is adapted to pivot on the support means and the installation includes reaction means adapted to oppose the torque applied by the rod to the nut, the rod is telescopic, the rod is threaded, the paddle is mounted on the rod and constrained to rotate with it about its axis, the rod is adapted to pivot in a nut adapted to pivot on the support means and the installation includes reaction means adapted to oppose the torque applied by the nut to the rod.

Other features and advantages of the present invention will become apparent on reading the following description and examining the accompanying drawings.

BRIEF DESCRIPTION OF THE DRAWINGS

FIG. 1 is a plan view of a first embodiment of the installation according to the invention.

FIG. 2 is a partial view of the above installation in section taken along the line II—II in FIG. 1 when it is placed on a vinification tank.

FIG. 3 is an enlarged view of one detail of a variant of the installation from FIG. 2.

FIG. 4 is an enlarged view of another detail of the installation from FIG. 2.

FIGS. 5 and 6 are partial views developed flat of other variants of the installation from FIG. 2.

FIG. 7 is a diagrammatic view of a second embodiment of the installation according to the invention.

DETAILED DESCRIPTION OF THE PREFERRED EMBODIMENTS

FIGS. 1 and 2 show a first embodiment of the installation according to the invention which includes support means such as a substantially cylindrical outer casing 1 formed at least in part from perforated stainless steel plate, for example.

A plate 3 is fixed in the top part of the above outer casing, transversely to its axis A.

The plate 3 is reinforced by a plurality of ribs 7a, 7b, 7c disposed in three pairs at 120°, for example, as can be seen in FIG. 1 in particular, and by a toroidal part 9 centered on the axis A.

The installation according to the invention can also include a motor-gearbox unit 11 and an electrical control cabinet 13 fixed to three arms 14a, 14b, 14c disposed at 120°. The above arms can themselves be fixed to three strain gauges 15a, 15b, 15c disposed at 120° and fixed to the plate 3, for example by means of screws 17a, 17b, 17c.

In one embodiment, shown in FIG. 3, the arms 14 can each be mounted to slide on a screw 19 fixed to the plate 3 by means of a nut 21, a spring 23 being disposed between the arm 14 and the head 24 of the screw 19 and a contactor 25 being mounted on the arm 14 and cooperating with the head 24 so that it is actuated when the arm moves relative to the screw 19.

The strain gauges 15 or the contactors 25 are electrically connected to the electrical control cabinet 13.

As can be seen in FIG. 1 in particular, a bar 26 is preferably joined to the top edge of the outer casing 1 by means of a plurality of spacers 27a, 27b, 27c, 27d, 27e, 27f.

FIG. 2 shows that the installation according to the invention also includes a ring system 28 disposed at the periphery of the outer casing 1, mounted to slide thereon and for example including a substantially toroidal part 29 and two optional diametrally opposed fixing plates 30a, 30b connected to the substantially toroidal part.

The ring system 28 can optionally include a plurality of (preferably three) hooks at 120° on the substantially toroidal part 29. Two of these hooks 31a, 31b can be seen in FIG. 2.

The installation according to the invention also includes a plurality of (preferably three) indexing systems at 120° on the outside of the outer casing 1. Two of the systems 32a, 32b can be seen in FIG. 2.

As can be seen in more detail in FIG. 4, each of the above indexing systems includes a plurality of hooks 33 intended to cooperate with holes in the plate forming the outer casing 1 and an indexing finger 35 provided with a grasping head 37 and spring-loaded by spring means (not shown) into the position shown in FIG. 4 in which it can cooperate with a hole of the outer casing 1.

If the ring system 28 includes hooks 31, each indexing system 32 can optionally include a counter-hook 39 intended to cooperate with each of the above hooks, as can be seen in FIG. 4.

FIG. 2 shows that the first embodiment of the installation according to the invention also includes a threaded rod 41 coupled to the motor-gearbox system 11, passing through the plate 3 and extending beyond the bottom edge 43 of the outer casing 1.

A nut 45 is mounted on the threaded rod 41 so that it can pivot and supports at least one and preferably two paddles 47a, 47b mounted substantially in opposition relative to the axis A.

Each paddle is reinforced by a rib 48a, 48b and preferably has an enlarged end 49a, 49b (see FIG. 1).

The threaded rod 41 and the two paddles 47a, 47b are preferably of stainless steel and the nut 45 is preferably of "foodstuffs" grade plastics material.

An abutment member 51 (see FIG. 2) is fixed to the bottom end of the threaded rod 41 in such a manner as to prevent the nut 45 escaping from the screw.

As shown, the two paddles 47a, 47b are preferably mounted on the nut 45 so that they can pivot between a deployed position shown in continuous line in FIG. 2 and a retracted position shown in chain-dotted line. Two springs 53a, 53b exert on the paddles forces tending to return them to their deployed position.

The nut 45 has at the bottom two abutment studs 55a, 55b against which the two paddles 47a, 47b bear when they are in the deployed position.

Each of the two paddles 47a, 47b can include a nose 56a, 56b adapted to bear against the toroidal part 9 of the plate 3 when the paddles are in the position shown in chain-dotted line.

In the first embodiment, the installation according to the invention includes reaction means which can include a plurality of flats (for example five flats) fixed axially to one half of the inside of the outer casing 1 and two fingers 60a, 60b fixed to the nut 45 substantially in opposition relative to the axis A. The fingers cooperate with the flats 59. Three of the flats 59a, 59b, 59c can be seen in FIG. 2

The first embodiment of the installation according to the invention can include pivoting means including a plurality of ramps (for example five ramps) fixed to the inside of the outer casing 1 above the flats 59 and inclined to the flats (for example at 45°) and a plurality of cranked links (for example five links) mounted to pivot inside the outer casing 1 about respective pins. Two of the ramps 61a, 61b, three of the cranked links 62a, 62b, 62c and three of the pins 63a, 63b, 63c can be seen in FIG. 2.

The cranked links 62 can turn only clockwise (as seen from the inside of the outer casing 1) from the position represented in FIG. 1 in which they abut against the associated ramps 61 (link 62a abuts on ramp 61a, link 62b abuts on ramp 61b, etc).

As can be seen in FIG. 2, the flats 59, the ramps 61 and the links 62 define Ys disposed inside the outer casing 1, as it were.

In a variant of the pivoting means visible in FIG. 5, the ramps 61 and the cranked links 62 can be replaced by a plurality of ratchets (for example five ratchets) fixed to the inside of the outer casing 1 above the flats 59 and by a plurality of bumpers (for example five bumpers) fixed to the inside of the outer casing 1 beside the ratchets 64. Only one of the ratchets 64 is shown in FIG. 6 and only one of the bumpers 65 is shown in FIG. 5.

Each ratchet 64 can include a first cylindrical member 66 fixed to the inside of the outer casing 1 and a second cylindrical member 67 mounted to slide inside the first cylindrical member 66, the above second cylindrical member tending to return downwards substantially into abutment against the flat 59 which is associated with it under its own weight.

According to another variant of the reaction means which can be seen in FIG. 6, the above means can include bottom teeth 68 including a plurality of teeth (for example eight teeth) fixed to the bottom edge 43 of the outer casing 1. Three of the teeth 69a, 69b, 69c can be seen in FIG. 6. The teeth preferably extend over only half the perimeter of the edge 43 when the installation according to the invention includes two paddles 47a, 47b.

Between two consecutive teeth 69 there is preferably a groove. Two such grooves 70a, 70b can be seen in FIG. 6.

When the installation according to the invention is equipped with this other variant of the reaction means, the pivoting means preferably include top teeth 73 including a plurality of teeth (for example sixteen teeth) substantially defining right-angle triangles fixed under the toroidal part 9 of the plate 3. Two of the above teeth 75a, 75b can be seen in FIG. 6.

Referring to FIG. 7, a second embodiment of the installation according to the invention can include, instead of the threaded rod 41, a telescopic rod 85 whose top part 87 is mounted fixed against movement in translation on the arms 14 and whose bottom part 89 supports the paddles 47.

The telescopic rod can be connected to an actuating device such as a hydraulic distribution system 91 known in the art.

In the above second embodiment only the last reaction and pivoting means mentioned above can be used.

The mode of operation and the advantages of the first embodiment of the installation according to the invention result directly from the foregoing description.

When the above installation must be moved from one vinification tank to another, the paddles 47a, 47b are in the top position shown in chain-dotted line in FIG. 2, in which the above paddles are retracted inside the outer casing 1.

In this configuration, the installation is relatively compact and there is less risk of damaging the paddles during handling.

Note that the fact that the plate forming the outer casing 1 is perforated reduces the weight of the installation, typically to around sixty kilograms, compared to the one hundred kilograms of the prior art.

Note also that the bar 26 facilitates holding the installation and protects the members which project out of the cylinder defined by the outer casing 1, such as the motor-gearbox unit 11, in particular when it is required to move the installation by rolling it along the ground.

To fit the installation to a tank 77 which has a substantially circular opening 79 (see FIG. 2), the outer casing 1 is inserted into the opening until the ring system 28 comes to bear on the edge 81 of the opening.

The height of the indexing systems 32 is then adjusted using their grasping heads 37 until the ends 49a, 49b of the paddles 47a, 47b (which are still in the top position shown in chain-dotted line) are approximately ten centimeters above the level of the mixture 83 of grape juice and marc inside the tank 77.

If necessary, the plates 30a, 30b are fixed to the edge 81 of the opening 79 and the installation operative checks that the counter-hooks 39 are correctly engaged in the hooks 31.

The electrical control equipment cabinet 13 can then be connected to the AC line voltage and the installation started up, for example by means of a switch (not shown) in the cabinet.

The operations described hereinabove are controlled by an electrical and/or electronic circuit inside the cabinet 13 (not shown).

The circuit can for example include programmable means (known in the art) for adapting the operation of the installation to the specific requirements of each vinification tank.

The nut 45 and the paddles 47a, 47b are initially in the top position shown in chain-dotted outline.

In this position the nut 45 is close to the plate 3 and the paddles 47a, 47b remain folded within the outer casing 1 but without touching it because the noses 56a, 56b abut under the toroidal part 9.

The threaded rod 41 is then turned clockwise (as seen from above the installation) by the motor-gearbox unit 11, which drives the nut 45 and the paddles 47a, 47b downward.

This being the case, in the installation shown in FIG. 2, one of the fingers 60, in this instance the finger 60a, moves downward with the nut 45 between one of the ramps 61 and the associated cranked link 62, for example between the ramp 61a and the cranked link 62a.

When the finger arrives substantially in the area in which the ramp 61a and the cranked link 62a are joined together, the finger moves the link 62a away by causing it to pivot on the pin 63a and then continue to move downward between the flats 59a and 59b.

The flat 59a applies to the finger a reaction force which prevents the nut 45 rotating about the axis A, which assures the downward movement of the nut 45.

As the nut 45 moves downward into the outer casing 1, the paddles 47a, 47b exit the outer casing progressively and the noses 56a, 56b move progressively away from the toroidal part 9, which enables progressive deployment of the paddles 47a, 47b by the forces applied by the springs 53a, 53b.

In this way an intermediate position (not shown) is reached in which the nut 45 is at the bottom of the outer casing 1, the finger 60a is between the two flats 59a, 59b and the two paddles 47a, 47b are completely deployed above the level of the mixture 83 of juice and marc.

As the threaded rod 41 continues to turn in the same direction, the two paddles 47a, 47b finish up reaching the mixture 83 and apply a thrust force to the marc floating in the grape juice, in particular via their enlarged ends 49a, 49b.

Eventually the finger 60a exits the outer casing 1 and the mixture 83 prevents the rotation of the two paddles 47a, 47b, thereby applying to the nut 45 the reaction force needed for its downward movement.

The abutment studs 55a, 55b prevent the two paddles 47a, 47b being folded up by virtue of the resistance offered by the marc.

When the ring system 28 is fixed to the edge 81 of the opening 79 in the tank 77 by means of the plates 30 and the indexing systems 32 have been fixed to the ring system through cooperation of the hooks 31 and the counter-hooks 39, the installation according to the invention enables a high thrust force to be applied to the marc without any risk of the outer casing 1 escaping from the opening 79.

Note that the presence of the strain gauges 15 or the contactors 25 enables the application to the threaded rod 41 of excessive forces or asymmetrical forces (for example if only one of the paddles 47a, 47b is applying a high thrust force to the marc) to be detected.

When the signals sent by the strain gauges 15 or the contactors 25 to the circuit in the cabinet 13 correspond to a situation of the above kind, the circuit immediately stops the motor-gearbox unit 11 to prevent twisting or even breaking of the threaded rod 41.

When the two paddles 47a, 47b reach the vicinity of the bottom of the tank 77, the motor-gearbox unit 11 stops and then starts to turn in the opposite direction, which raises the nut 45 and the two paddles 47a, 47b.

If the two paddles encounter suspended marc as they move upward, they can retract downward against the return forces applied by the two springs 53a, 53b, so that the marc remains in its submerged position.

The nut 45 therefore progressively returns to the intermediate position mentioned above and the finger 60a returns to its position between the two flats 59a, 59b. This is because the nut 45 has not pivoted about the axis A during its downward movement beyond its intermediate position and its upward movement toward its intermediate position, because of the reaction forces applied by the marc to the two paddles 47a, 47b.

When the paddles 47a, 47b exit the mixture 83, there is momentarily no reaction force on the nut 45 and it pivots about the axis A in the anticlockwise direction (as seen from above the installation) until the finger 60*a* bears against the flat 59*b*.

As the nut 45 moves upward, the finger 60*a* moves along the flat 59*b* and then the ramp 61*b* until its abuts against the link 62*a* (which can turn only clockwise, as seen from inside the outer casing 1, from the position shown in FIG. 2) and the finger is therefore obliged finally to take up a position between the links 62*a* and 62*b* when the nut 45 returns to the top position shown in chain-dotted line in FIG. 2.

Accordingly, the finger 60*a* is between the flats 59*b* and 59*c* when the threaded rod begins to turn again in the clockwise direction (as seen from above the installation) to lower the nut 45 and the paddles 47*a*, 47*b*.

The paddles 47*a*, 47*b* therefore pass progressively from an angular sector corresponding to two flats 59 to another angular sector corresponding to the next two flats, the width of each of these angular sectors depending on the number of flats 59, ramps 61 and links 62 inside the outer casing 1.

The paddles 47*a*, 47*b* are therefore able to act on complementary angular sectors of the mixture 83 when they move downward.

In the embodiment shown in FIG. 5 the change from one angular sector to another occurs when a finger 60 (see FIG. 2) raises the second cylindrical member 67 of the ratchet 64 to move from one side of the flat 59 to its other side.

The bumper 65 prevents the finger 60 moving past several flats 59 at a time.

In the embodiment shown in FIG. 6 the paddles 47*a*, 47*b* are guided relative to the outer casing 1 in each angular sector by one of the grooves 70, which cooperates with one of the ribs 48 on the paddles.

To explain how the paddles 47*a*, 47*b* move from one angular sector to another in this embodiment, FIG. 6 shows schematically one of the ribs 48 and one of the noses 56 when the nose comes into contact with one tooth 75*a* of the top teeth 73 (the positions of the rib and the nose are then 48-1 and 56-1, respectively) and when the nose has practically reached the bottom of the top teeth 73 (the positions of the rib and the nose are then 48-2 and 56-2, respectively).

When the nose 56 moves from its position 56-1 to its position 56-2 by sliding over the tooth 75*a* because of the upward movement of the nut 45 (see FIG. 2) the rib 48 leaves its position 48-1 and passes over the crest of the tooth 69*b* to reach its position 48-2.

Accordingly, when the nut 45 begins to move downward again because of the change in the direction of rotation of the threaded rod 41 (see FIG. 2) the rib 48 is placed in the next groove 70*b*, which achieves the required change of angular sector.

In the second embodiment of the installation according to the invention the upward and downward movements of the paddles 47 are respectively obtained by shortening or lengthening the telescopic rod 85.

In each of the embodiments described above the paddles 47*a*, 47*b* gently immerse a part of the marc in the mixture 83 on each downward movement, which progressively transfers some of the tannin and color to the grape juice.

Carrying out this immersion in complementary angular sectors achieves a progressive turning over of the marc so that all of it is brought into contact with the juice.

Also, immersion in complementary angular sectors avoids compacting the marc, which prevents an increase in temperature that could compromise fermentation.

Moreover, the fact that the paddles 47*a*, 47*b* can retract when the nut 45 moves upward prevents agitation of the marc and the juice, which avoids the destruction of certain aromatic and phenolic substances.

It follows from the foregoing description that the above advantages can be achieved without it being necessary for the rod 41, 85 to project above the outer casing 1, which reduces the overall vertical dimension of the installation, avoids the need for any protective casing and reduces the cost of manufacture and the weight of the installation.

Moreover, it is seen that the reaction and pivoting means are moved at least in part inside the outer casing, which reduces the overall vertical dimension, the cost of manufacture and the weight of the installation.

The weight of the reaction and pivoting means is particularly low if some of the members forming those means (flats 59, ramps 61, links 62, ratchets 64, bumpers 65, bottom teeth 68) are provided on only one half of the outer casing 1.

Of course, the present invention is not limited to the embodiment described and shown, which is given by way of illustrative and non-limiting example only.

For example, the installation according to the invention could include more than two paddles, for example three paddles at 120° or four paddles at 90°.

Likewise the flats 59, the ramps 61, the links 62, the ratchets 64, the bumpers 65 and the bottom teeth 68 could extend on the entire perimeter of the outer casing 1. However, this solution would have the disadvantage of increasing the cost of manufacture and the weight of the installation according to the invention.

Likewise a prior art installation of the kind described in the preamble of the present description (i.e. an installation in which the threaded rod moves vertically) could be envisaged in which the reaction and/or pivoting means would be moved into the volume defined by the support means.

Likewise the installation according to the invention could be used to stir substances other than a mixture of marc and grape juice.

There is claimed:

1. An installation for immersing the grape in its juice in a vinification tank, said installation including support means adapted to be installed over an opening of said tank, a paddle adapted to be moved on said support means by a rod between a top area which in use is above said juice and a bottom area which in use is in said juice, and means for pivoting said paddle by a predetermined angle about the axis of said rod when said paddle is in said top area, wherein the top end of said rod is mounted on said support means and fixed against movement in an axial translation.

2. The installation claimed in claim 1 wherein said rod is threaded, said paddle is adapted to be pivoted about the axis of said rod by a nut, said rod is adapted to pivot on said support means and said installation includes reaction means adapted to oppose the torque applied by said rod to said nut.

3. The installation claimed in claim 2 wherein said reaction means are at least in part disposed inside the volume defined by said support means.

4. The installation claimed in claim 3 wherein said reaction means include two fingers mounted in opposition on said nut and a plurality of flats mounted axially on a bottom half of said support means and adapted to cooperate with said fingers.

5. The installation claimed in claim 3 wherein said reaction means include a rib formed on said paddle and bottom teeth fixed to a bottom part of said support means and adapted to cooperate with said rib.

6. The installation claimed in claim 5 wherein said pivoting means include top teeth fixed in a top part of said support means and adapted to cooperate with said nose and the teeth of said top teeth are adapted to act on said paddle through the intermediary of said nose so as to cause said paddle to move from one tooth to the other of said bottom teeth.

7. The installation claimed in claim 1 wherein said rod is telescopic.

8. The installation claimed in claim 2 including a motor-gearbox unit mechanically coupled to said threaded rod to turn it selectively in one direction or the other and an electrical control equipment cabinet electrically connected to said motor-gearbox unit to control the operation thereof.

9. The installation claimed in claim 1 wherein said rod is connected to said support means by a plurality of arms.

10. The installation claimed in any one of claims 8 and 9 wherein said motor-gearbox unit and said electrical equipment cabinet are mounted on said arms.

11. The installation claimed in claim 9 wherein there are three arms disposed substantially at 120°.

12. The installation claimed in claim 9 wherein said arms are connected to said support means by force-measuring means selected from the group comprising strain gauges and spring and contactor type systems.

13. The installation claimed in any one of claims 9 and 12 wherein said strain gauges or said spring and contactor type systems are electrically connected to said electrical control equipment cabinet.

14. The installation claimed in claim 1 wherein said support means include a substantially cylindrical outer casing with said rod inside it.

15. The installation claimed in claim 14 wherein said support means further include a plate fixed in the top part of said outer casing with said rod crossing it.

16. The installation claimed in any one of claims 9 and 15 wherein said arms are mounted on said plate.

17. The installation claimed in claim 15 wherein said plate is reinforced by a substantially toroidal part.

18. The installation claimed in claim 17 wherein said paddle includes a nose adapted to cooperate with said substantially toroidal part to enable complete folding of said paddle into said outer casing.

19. The installation claimed in claim 18 wherein said pivoting means include top teeth fixed in a top part of said support means and adapted to cooperate with said nose and the teeth of said top teeth are adapted to act on said paddle through the intermediary of said nose so as to cause said paddle to move from one tooth to the other of said bottom teeth.

20. The installation claimed in claim 14 including a ring system adapted to slide on the outside of said outer casing and to bear on said tank and a plurality of indexing systems adapted to hold said ring system on said outer casing at a height that can be varied.

21. The installation claimed in claim 20 wherein said ring system includes a plurality of plates adapted to be fixed to said tank and a plurality of hooks and wherein said indexing systems each include a counter-hook adapted to cooperate with one of said hooks.

22. The installation claimed in claim 1 wherein said paddle is adapted to pivot relative to said rod between a deployed position in which said paddle can push on said grape when it move downward in said tank and a retracted position in which said paddle can move upward in said tank without entraining said grape.

23. The installation claimed in any one of claims 2 and 22 wherein said paddle is adapted to pivot on said nut.

24. The installation claimed in claim 23 including spring means disposed between said nut and said paddle to urge said paddle toward said deployed position.

25. The installation claimed in any one of claims 14 and 22 wherein said paddle is adapted to be accommodated at least in part inside said outer casing when it is in said retracted position.

26. The installation claimed in claim 25 wherein said paddle includes a nose adapted to cooperate with said substantially toroidal port to enable complete folding of said paddle into said outer casing.

27. The installation claimed in claim 26 wherein said pivoting means include top teeth fixed in a top part of said support means and adapted to cooperate with said nose and the teeth of said top teeth are adapted to act on said paddle through the intermediary of said nose so as to cause said paddle to move from one tooth to the other of said bottom teeth.

28. The installation claimed in claim 1 wherein said paddle has an enlarged end.

29. The installation claimed in claim 1 including two paddles mounted substantially in opposition relative to the axis of said rod.

30. The installation claimed in claim 1 wherein said support means are formed at least in part of a perforated plate.

31. An installation for immersing the grape in its juice in a vinification tank, said installation including support means adapted to be installed over an opening of said tank and defining a certain volume, a paddle adapted to be moved on said support means by a rod between a top area which in use is above said juice and a bottom area which in use is in said juice and means for pivoting said paddle by a predetermined angle about the axis of said rod when said paddle is in said top area, wherein said pivoting means are at least in part disposed inside said volume.

32. The installation claimed in claim 31 wherein said rod is telescopic.

33. The installation claimed in claim 31 wherein said rod is threaded, said paddle is mounted on said rod and constrained to rotate with it about its axis, said rod is adapted to pivot in a nut adapted to pivot on said support means and said installation includes reaction means adapted to oppose the torque applied by said nut to said rod.

34. The installation claimed in any one of claims 1 and 31 wherein said rod is threaded, said paddle is adapted to be pivoted about the axis of said rod by a nut, said rod is adapted to pivot on said support means and said installation includes reaction means adapted to oppose the torque applied by said rod to said nut.

35. The installation claimed in any one of claims 31 and 4 wherein said pivoting means include a plurality of inclined ramps fixed to the inside of the volume defined by said support means in line with said flats and a plurality of cranked links associated with said inclined ramps and each of said cranked links is adapted to pivot on the inside of said volume between a position in which it is abutted against its associated ramp and a position in which it is moved away from that ramp by one of said fingers.

36. The installation claimed in any one of claims 31 and 4 wherein said pivoting means include a plurality of ratchets fixed to the inside of the volume defined by said support means in line with said flats and a plurality of bumpers associated with said ratchets and each of said ratchets is adapted to move between a position in which it is substantially abutted against its associated flat and a position in which it is moved away from that flat by one of said fingers.

* * * * *